(12) United States Patent
Chen et al.

(10) Patent No.: US 12,565,433 B2
(45) Date of Patent: Mar. 3, 2026

(54) METHODS FOR DECREASING CALCIUM SULFATE PRECIPITATION IN PRODUCED WATER

(71) Applicant: SAUDI ARABIAN OIL COMPANY, Dhahran (SA)

(72) Inventors: Tao Chen, Dhahran (SA); Qiwei Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 613 days.

(21) Appl. No.: 18/062,171

(22) Filed: Dec. 6, 2022

(65) Prior Publication Data

US 2024/0182332 A1      Jun. 6, 2024

(51) Int. Cl.
    C02F 1/52          (2023.01)
    C02F 1/58          (2023.01)
             (Continued)

(52) U.S. Cl.
    CPC .............. C02F 1/5245 (2013.01); C02F 1/58 (2013.01); *C02F 2101/101* (2013.01);
             (Continued)

(58) Field of Classification Search
    CPC .... C02F 1/5245; C02F 1/58; C02F 2101/101; C02F 2103/06; C02F 2209/19; C02F 2303/22; C02F 2103/10; C02F 1/5236
    See application file for complete search history.

(56) References Cited

U.S. PATENT DOCUMENTS 7,717,173 B2 *    5/2010   Grott ......................... C02F 1/42
                                                          166/267
9,643,865 B2      5/2017   Matherly et al.
                  (Continued)

FOREIGN PATENT DOCUMENTS

| CN | 109956579 A | 7/2019 |
| CN | 216711666 U | 6/2022 |
| WO | 2012109313 A1 | 8/2012 |

OTHER PUBLICATIONS

Mobeen Murtaza, et al.; Application of Anhydrous Calcium Sulfate as a Weighting Agent in Oil-Based Drilling Fluids, ACS Omega 2021, 6, 33, 21690-21701.

*Primary Examiner* — Waqaas Ali
(74) *Attorney, Agent, or Firm* — Vorys, Sater, Seymour and Pease LLP

(57)                ABSTRACT

Precipitation or scaling may occur when combining produced water from multiple sources, such as when one produced water contains dissolved calcium ions and another produced water contains dissolved sulfate anions. The tendency toward precipitation or scaling may be decreased by treating the produced water containing dissolved sulfate anions. Such methods may comprise: providing a first produced water comprising dissolved sulfate anions; treating the first produced water with a metal salt capable of forming an insoluble metal sulfate, thereby forming a metal sulfate precipitate and a treated produced water; separating the metal sulfate precipitate from the treated produced water; and after separating the metal sulfate precipitate, mixing the treated produced water with at least one second produced water to obtain a mixed produced water, the at least one second produced water containing dissolved calcium ions, and the mixed produced water having a saturation ratio for calcium sulfate of less than 1.

22 Claims, 2 Drawing Sheets

(51) Int. Cl.
    *C02F 101/10*         (2006.01)
    *C02F 103/06*         (2006.01)

(52) U.S. Cl.
    CPC ...... *C02F 2103/06* (2013.01); *C02F 2209/19*
                 (2013.01); *C02F 2303/22* (2013.01)

(56)             References Cited

U.S. PATENT DOCUMENTS

| | | | | |
|---|---|---|---|---|
| 10,913,889 | B2 | 2/2021 | Li et al. | |
| 2010/0200495 | A1* | 8/2010 | Borole .................... | C02F 3/005 |
| | | | | 210/243 |
| 2013/0319951 | A1* | 12/2013 | Smith ................... | C02F 1/5245 |
| | | | | 210/722 |

\* cited by examiner

METHODS FOR DECREASING CALCIUM SULFATE PRECIPITATION IN PRODUCED WATER

FIELD OF THE DISCLOSURE

The present disclosure relates generally to management of produced water and, more particularly, to decreasing the concentration of dissolved sulfate anions in produced water to limit formation of precipitated calcium sulfate (gypsum).

BACKGROUND OF THE DISCLOSURE

Produced water obtained from some subterranean reservoirs, particularly carbonate reservoirs, may contain high concentrations of dissolved calcium ions. For example, produced acidizing fluids expelled following stimulation of a carbonate formation may contain very high concentrations of dissolved calcium ions as a consequence of dissolution of a portion of the carbonate formation matrix to generate wormholes. In other instances, produced water may contain high concentrations of dissolved sulfate anions. In non-limiting examples, subterranean reservoirs flooded with seawater may expel produced water with high levels of dissolved sulfate anions. Produced water sources containing dissolved calcium ions and dissolved sulfate anions may be incompatible when combined together due to ready precipitation or scaling of highly insoluble calcium sulfate dihydrate (gypsum), even when the ionic concentrations are very low. Gypsum is the thermodynamically favorable form of precipitated calcium sulfate at temperature below about 100° C. Unfortunately, it may be difficult to keep produced waters having different chemistries and obtained from different sources from coming into contact with one another, since separate subterranean reservoirs producing the different types of water may be in fluid communication with a common pipeline (trunkline) for conveying the produced water and produced hydrocarbons away from a series of wells for further processing.

Formation of precipitated gypsum or gypsum scale within the common pipeline or elsewhere within an oilfield facility may be problematic, as the precipitated gypsum or gypsum scale may plug flow lines within surface processing facilities and/or impede fluid flow within the trunkline. Gypsum scale, as opposed to loose calcium sulfate precipitates, may be exceedingly troublesome, as the scale may be crust-like and require mechanical debridement to facilitate adequate removal thereof. These operations can be very costly and labor-intensive and may result in significant system downtime. Scale inhibitors may be used to limit or delay precipitation or scaling in the event the calcium sulfate concentration exceeds the solubility limit under anticipated working conditions. Scale inhibitors may fail as the concentration of dissolved ions increases, the concentration of scale inhibitor decreases (e.g., due to degradation or consumption) and/or if the holding time above the saturation limit is too long, since the produced water may be effectively supersaturated with calcium sulfate, a thermodynamically unstable state. Thus, a scale inhibitor may be ineffective for protecting against calcium sulfate precipitation or scaling in long trunklines or flow pipes, in which extended contact times may occur. Another drawback of some scale inhibitors is that they may interfere with the performance of various corrosion inhibitors, which may lead to other types of wellbore system damage.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, methods for limiting calcium sulfate precipitation or scaling may comprise: providing a first produced water comprising dissolved sulfate anions; treating the first produced water with a metal salt capable of forming an insoluble metal sulfate, thereby forming a metal sulfate precipitate and a treated produced water; separating the metal sulfate precipitate from the treated produced water; and after separating the metal sulfate precipitate, mixing the treated produced water with at least one second produced water to obtain a mixed produced water, the at least one second produced water containing dissolved calcium ions, and the mixed produced water having a saturation ratio for calcium sulfate of less than 1.

In another embodiment consistent with the present disclosure, methods for limiting calcium sulfate precipitation or scaling may comprise: providing a first produced water comprising dissolved sulfate anions; treating the first produced water with a metal salt dissolved in an aqueous solution, thereby forming a metal sulfate precipitate and a treated produced water; separating the metal sulfate precipitate from the treated produced water; and after separating the metal sulfate precipitate, mixing the treated produced water with at least one second produced water in a common pipeline to obtain a mixed produced water, the at least one second produced water containing dissolved calcium ions, and the mixed produced water having a saturation ratio for calcium sulfate of less than 1 in the pipeline.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
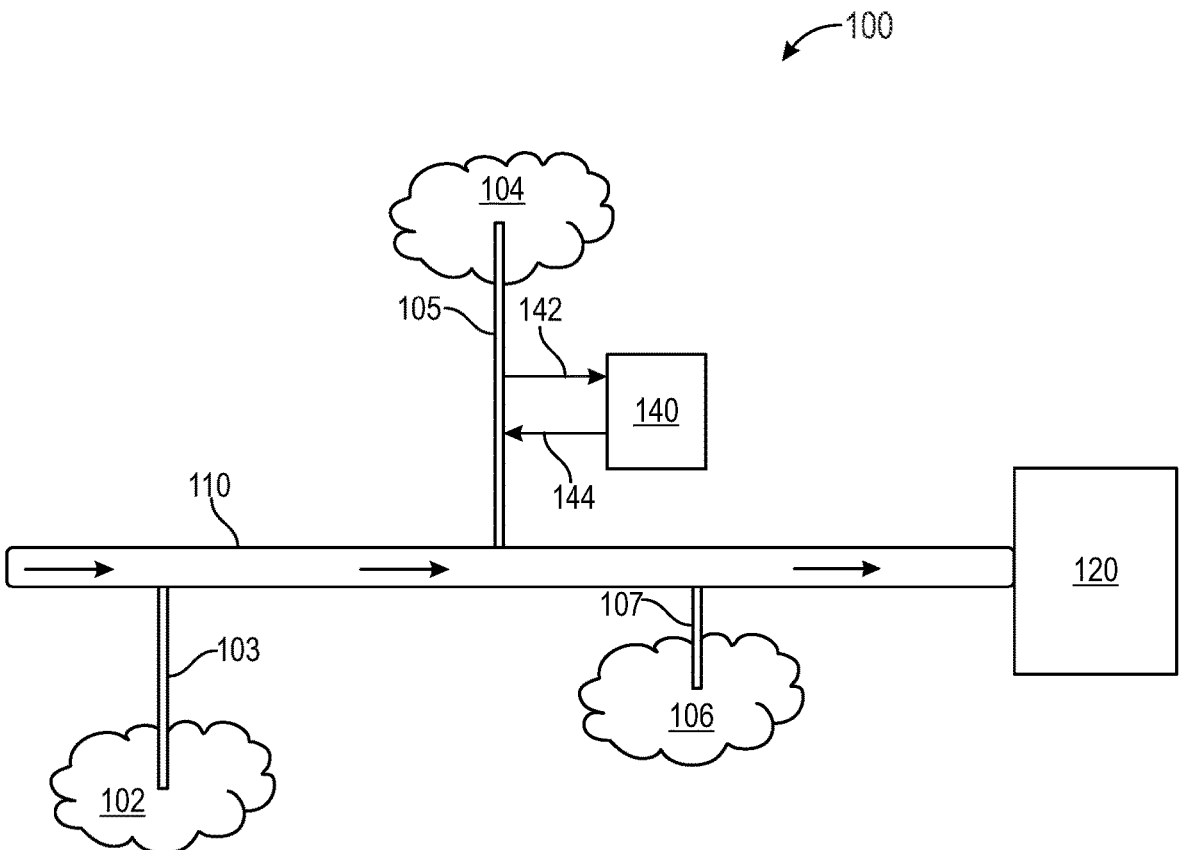
FIG. 1 is a diagram of a well system 100 containing multiple subterranean reservoirs in fluid communication with a pipeline, in which the methods of the present disclosure may be practiced.

Embodiments in accordance with the present disclosure generally relate to management of produced water and, more particularly, to decreasing the concentration of dissolved sulfate anions in produced water to limit formation of precipitated calcium sulfate (gypsum).

The present disclosure describes methods for decreasing calcium sulfate precipitation or scaling from produced waters in surface processing facilities, such as when combining two or more produced waters with one another, for example, in a common pipeline in fluid communication with multiple subterranean reservoirs, which receive produced water and produced hydrocarbon resources therefrom. For instance, a first produced water may contain dissolved calcium ions (e.g., spent acidizing fluid obtained following acidizing of a carbonate reservoir) and a second produced water may contain dissolved sulfate anions (e.g., from a seawater-flooded reservoir), such that a mixed produced water formed therefrom may be above a solubility product concentration for calcium sulfate ($K_{sp}$~3.1×10$^{-5}$ at 25° C. for calcium sulfate dihydrate (gypsum) and $K_{sp}$~4.9×10$^{-5}$ at 25° C. for anhydrous calcium sulfate), thereby leading to potential calcium sulfate precipitation or scaling. The tendency toward precipitation or scaling may also be characterized by the saturation ratio, as explained further below, wherein a calcium sulfate concentration producing a saturation ratio of one or above may lead to an increased tendency toward precipitation or scaling. Supersaturation at or above the solubility product concentration (or the saturation ratio concentration) may occur in some instances, in which case precipitation or scaling may occur unpredictably. The methods of the present disclosure alleviate this difficulty by allowing dissolved calcium ions to be maintained in the mixed produced water at high concentrations in a thermodynamically stable state not possible when using scale inhibitors.

To accomplish the foregoing, the methods described herein leverage the low solubility of certain metal sulfates to form a treated produced water from produced water sources initially containing significant quantities of dissolved sulfate anions. By precipitating insoluble metal sulfates and then separating, the treated produced water may contain a decreased concentration of dissolved sulfate anions, which may allow the treated produced water to be combined with a produced water containing dissolved calcium ions, such that in the resulting mixed produced water, calcium sulfate may remain below a solubility product concentration (or the saturation ratio concentration) while still having a high concentration of dissolved calcium ions present therein. That is, the methods of the present disclosure decrease the concentration of dissolved sulfate anions to non-problematic levels, such that limited to no precipitation or scaling of calcium sulfate takes place when combining the treated produced water with a produced water containing high concentrations of dissolved calcium ions. Decreasing the concentration of dissolved sulfate anions in the produced water prior to being combined with another produced water may be accomplished by treating the produced water containing dissolved sulfate anions with a metal salt that forms an insoluble metal sulfate (metal sulfate precipitate), such as an alkaline earth metal halide. The resulting metal sulfate precipitate may be formed under controlled conditions and then undergo separation from the treated produced water prior to being combined with a produced water containing dissolved calcium ions. Formation of a metal sulfate precipitate under controlled conditions and at an expected time may be readily addressed through standard techniques for separating solids, whereas uncontrolled or ill-timed formation of calcium sulfate precipitates or scale (gypsum scale) may be exceptionally difficult to address for the reasons noted above. Following removal of the metal sulfate precipitate from the treated produced water, the treated produced water may be mixed with one or more produced waters from other source(s) containing dissolved calcium ions but with a significantly decreased risk of forming calcium sulfate, either as loose precipitates or scale.

The methods described herein may reduce or effectively eliminate the formation of calcium sulfate precipitation or scaling, particularly calcium sulfate dihydrate (gypsum) precipitation and scaling, when combining otherwise incompatible sources of produced water with one another. Doing so may protect surface processing facilities, such as pipelines and refining facilities, from calcium sulfate precipitation and scaling during extended contact with blends of produced water that may otherwise be subject to precipitation and scaling. Resultantly, the methods of the present disclosure may decrease operating downtime of surface facilities, thereby lowering operating expenses and potentially lengthening the operating lifetime of the surface facilities. In addition, the methods of the present disclosure may reduce consumption of scale inhibitors or allow scale inhibitors to be used more effectively, again lowering operating costs by decreasing the expense of consumable materials. Overall, the methods and systems of the present disclosure may simplify management of a produced water inventory during further processing thereof upon the earth's surface.

As used herein, the term "produced water" refers to water that is expelled from a subterranean formation to the earth's surface as a byproduct of production of a hydrocarbon resource (e.g., oil or natural gas). Produced water may include formation water natively present within the subterranean operation or an aqueous treatment fluid (or an at least partially spent variant thereof) introduced to the subterranean formation as part of a treatment operation associated with producing the hydrocarbon resource.

As used herein, the terms "treat," "treatment," "treating." and grammatical equivalents thereof refer to any compound, fluid, or combination thereof that is introduced to a subterranean formation with the goal of achieving a desired function and/or for a desired purpose. Unless otherwise specified, use of the term "treatment" does not imply any particular action by a treatment fluid or a component thereof. Illustrative treatments include, but are not limited to, drilling operations, stimulation operations (e.g., fracturing operations, acidizing operations, acid fracturing operations, and the like), production operations, remediation operations, sand control operations, flooding operations, enhanced oil recovery and the like.

As used herein, the term "solubility product constant ($K_{sp}$)" refers to the equilibrium constant for dissolution of a sparingly soluble substance in an aqueous fluid. For calcium sulfate dissolution, the equilibrium dissolution is given by Reaction 1.

$$CaSO_4(s) \leftrightarrow Ca^{2+}(aq) + SO_4^{2-}(aq) \qquad \text{(Reaction 1)}$$

The corresponding solubility product constant is given by $K_{sp}=[Ca^{2+}(aq)]\times[SO_4^{2-}(aq)]$, where the bracketed values are molar concentrations of each ion. Calcium sulfate precipitation occurs when the product $[Ca^{2+}(aq)]\times[SO_4^{2-}(aq)]$ exceeds $K_{sp}$. In the case of equimolar quantities of dissolved calcium ions and dissolved sulfate anions, the $K_{sp}$ value of 3.1×10$^{-5}$ at 25° C. is exceeded when the concentration of dissolved calcium ions and dissolved sulfate ions both are approximately 0.0056 M.

As used herein, the term "above a solubility product concentration for calcium sulfate" refers to a concentration of dissolved calcium ions above 0.0056 M, such as about 0.01 M or greater, or about 0.1 M or greater, or about 1 M or greater. When dissolved calcium ions are above the solubility product concentration, the concentration of dissolved sulfate ions is at least below 0.0056 M, such as about 0.0001 M or below, or about 0.00001 M or below, or about 0.000001 M or below. As a non-limiting example, when the dissolved sulfate concentration is 0.0001 M, the corresponding dissolved calcium ion concentration needed to precipitate calcium sulfate is 0.031 M.

As used herein, the term "saturation ratio" refers to the scaling tendency of a solution after all potential solids in the solution have come to equilibrium with water under a specified set of conditions. The formula for saturation ratio is given in Equation 1

$$SR=(a_1 \times a_2)/K_{sp}$$ Equation 1 wherein SR is the saturation ratio, $a_1$ and $a_2$ are the activities of each species (specifically the activity of a scaling cation and a scaling anion in the solution, respectively), and $K_{sp}$ is the solubility product constant, which depends on the pressure and the temperature. The values for $a_1$ and $a_2$ are determined as the product $\gamma \times C$, where C is the concentration of each scaling ion in the solution and $\gamma$ is the ionic activity coefficient for each activity. If the SR is less than one (1), the solution is undersaturated and scale formation is not thermodynamically feasible. If the SR is one (1), the solution is saturated, in which case scale formation and scale dissolution occur at the same rate in the solution and no scale is formed. If the SR is greater than one (1), the solution is supersaturated and scale formation is thermodynamically possible.

Methods for reducing or eliminating calcium sulfate precipitation or scaling when combining produced waters are described herein. Non-limiting example methods may comprise providing a first produced water comprising dissolved sulfate anions. The first produced water may be treated with a metal salt capable of forming an insoluble metal sulfate, thereby forming a metal sulfate precipitate and a treated produced water. The metal sulfate precipitate may then be separated from the treated produced water. Following the separation, the treated produced water may be mixed with at least one second produced water to obtain a mixed produced water. The at least one second produced water may contain dissolved calcium ions and the mixed produced water may maintain the dissolved calcium ions at a concentration such that a saturation ratio for calcium sulfate is less than one. That is, the concentration of dissolved sulfate anions in the first produced water may be decreased through metal sulfate precipitation, such that a higher concentration of dissolved calcium ions may be maintained in the mixed produced water without precipitation or scaling occurring. The maximum concentration of dissolved calcium ions in the mixed produced water may be dictated by the concentration of dissolved sulfate ions attained in the first produced water, such that the saturation ratio does not exceed a value of one.

The first produced water comprising dissolved sulfate anions may be obtained from one or more subterranean reservoirs, which may be onshore and/or offshore. In addition to dissolved sulfate anions, constituents within the first produced water may include, but are not limited to, sodium ions, potassium ions, magnesium ions, calcium ions, strontium ions, bicarbonate anions, chloride anions, the like, and any combination thereof. Since magnesium, calcium, and strontium form insoluble metal sulfates, it is to be appreciated that the concentrations of these ions may be below the corresponding solubility product concentrations (or saturation ratio concentration) for magnesium sulfate, calcium sulfate, and strontium sulfate, each based on the amount of dissolved sulfate ions that are present in the first produced water, unless supersaturation occurs. Alternately, the first produced water may be slightly supersaturated with respect to magnesium sulfate, calcium sulfate, and strontium sulfate, in which case the $K_{sp}$ may be exceeded or the saturation ratio may be greater than one. In non-limiting examples, the first produced water may comprise seawater produced from a seawater injection well. It is to be appreciated that other types of produced water may contain high levels of dissolved sulfate anions and may be treated similarly in the disclosure herein.

The concentration of dissolved sulfate anions in the first produced water prior to treatment may range from 0 mg/L to about 6,000 mg/L, or about 0 mg/L to about 1,000 mg/L, or about 500 mg/L to about 2,500 mg/L, or about 500 mg/L to about 6,000 mg/L. The first produced water may have a pH of about 5 to about 8, or about 5 to about 7, or about 6 to about 8. Sulfate anion concentrations following treatment are specified below.

Metal salts capable of forming an insoluble metal sulfate and suitable for treating the first produced water may include alkaline earth metal salts, such as alkaline earth metal halides, which are soluble in aqueous fluids but the corresponding sulfates are not. Particular examples of alkaline earth metal salts suitable treating the first produced water may include, for instance, barium chloride, calcium chloride, strontium chloride, or any combination thereof. The corresponding solubility product constants of barium sulfate, calcium sulfate, and strontium sulfate in water are $1.1 \times 10^{-10}$, $3.1 \times 10-5$ (dihydrate value), and $3.4 \times 10^{-7}$ (all values at 25° C.). Therefore, each of these metal salts are capable of lowering the sulfate concentration in the first produced water to or below the solubility product concentration for calcium sulfate when combined with the at least one second produced water, provided that a sufficient amount of metal salt is added to decrease the sulfate anion concentration in the mixed produced water to or below the solubility product concentration by precipitating metal sulfate from the first produced water. The metal salt may be dissolved in an aqueous solution when treating the first produced water, or the metal salt may be added as a solid to the first produced water. When added as a solid, the metal salt may undergo dissolution in the first produced water and promote formation of a metal sulfate precipitate as dissolution occurs.

The amount of metal salt used in the treatment of the first produced water may be determined using a thermodynamic prediction model. The thermodynamic prediction model may calculate a suitable amount of metal salt for treatment of the first produced water given the initial concentration of dissolved sulfate anions therein. Moreover, the thermodynamic prediction model may determine parameters such as the saturation ratio and concentration of calcium sulfate dihydrate solids formed upon mixing one or more produced waters together. In non-limiting examples, such thermodynamic predictions may be made using SCALESOFT-PITZER™, an academic program developed by the Brine Chemistry Consortium at Rice University. It is to be appreciated that the principles of the present disclosure do not require modeling for successful practice thereof, and suitable amounts of metal salt and produced water(s) for use under given circumstances may be determined empirically.

Metal sulfate precipitates formed from treatment of the first produced water with the metal salt may be separated from the treated produced water using a separation device. Examples of suitable separation devices for separating the metal sulfate precipitates from the treated produced water include, but are not limited to, centrifugal separators, cyclone separators, gravitational sedimentation units, settling ponds, bag filters, medium filters (depth filters), the like, and any combination thereof. Suitable separation techniques using the foregoing will be familiar to one having ordinary skill in the art.

Once separated from the treated produced water, the metal sulfate precipitates may be discarded, processed into a product, or utilized in a process. As a non-limiting example, metal sulfate precipitates may be used as a weighting agent for subterranean operations, such as wellbore drilling. Barium sulfate (barite) is commonly used for this purpose. As another non-limiting example, calcium sulfate (gypsum) precipitates may be processed into drywall board. Other examples of products and processes utilizing or incorporating metal sulfate precipitates may be envisioned by one having ordinary skill in the art. Optionally, the metal sulfate precipitates may be purified or further refined if being utilized in accordance with the foregoing.

Following separation of the metal sulfate precipitates, the treated produced water may have a lower concentration of dissolved sulfate anions than the first produced water prior to treatment. Depending on the metal salt used and the amount thereof, the treated produced water may have a dissolved sulfate anion concentration of about 200 ppm or less, or about 100 ppm or less, or about 50 ppm or less, such as about 50 ppm to about 150 ppm, or about 100 ppm to about 200 ppm, or about 10 ppm to about 100 ppm, or about 10 ppm to about 50 ppm. The corresponding sulfate anion molar concentrations are about 0.002 M or less, or 0.001 M or less, or about 0.0005 M or less, such as about 0.0005 M to about 0.0015 M, or about 0.001 M to about 0.002 M, or about 0.0001 M to 0.001 M, or about 0.0001 M to about 0.0005 M. Based on the corresponding $K_{sp}$ values specified above, a 0.002 M concentration of sulfate anions may be reached using $5.5 \times 10^{-8}$ M barium chloride, 0.016 M calcium chloride, or $1.7 \times 10^{-4}$ M strontium chloride. More complete removal of dissolved sulfate anions in the form of a metal sulfate precipitate may be affected by using a higher amount or concentration of metal halide. As a non-limiting example, again based on $K_{sp}$ values, a 0.1 M barium chloride solution may afford a dissolved sulfate anion concentration of $1.1 \times 10^{-9}$ M and a 0.1 M strontium chloride solution may afford a dissolved sulfate anion concentration of $3.4 \times 10^{-6}$ M. A suitable amount of dissolved sulfate anions remaining in the treated produced water following precipitation may be selected based upon the amount of dissolved calcium ions present in the at least one second produced water with which the treated produced water is to be combined.

The treated produced water may be mixed with at least one second produced water to obtain a mixed produced water, from which calcium sulfate precipitation or scaling does not occur or only occurs to a very limited extent. The at least one second produced water may contain dissolved calcium ions at a concentration ranging from about 500 mg/L to about 35,000 mg/L, or about 500 mg/L to about 10,000 mg/L, or about 5,000 mg/L to about 20,000 mg/L, or about 10,000 mg/L to about 35,000 mg/L. The corresponding molar calcium ion concentrations are about 0.012 M to about 0.88 M, or about 0.012 M to about 0.25 M, or about 0.12 M to about 0.50 M, or about 0.25 M to about 0.88 M. A concentration of dissolved sulfate anions in the treated produced water may be selected to maintain the dissolved calcium ions in the resulting mixed produced water, such that the solubility product constant for calcium sulfate is not exceeded or such that the saturation ratio for calcium sulfate is less than one.

It should be further appreciated that the amount of the treated produced water mixed with the at least one second produced water may further influence the concentrations of dissolved sulfate anions and dissolved calcium ions, which may or may not exceed the solubility product constant (or the saturation ratio concentration) for calcium sulfate depending on the amount of dilution that takes place. As a non-limiting example, if the treated produced water contains 0.001 M dissolved sulfate anions and the at least one second produced water contains 0.25 M dissolved calcium ions, the concentrations of the dissolved calcium ions and the dissolved sulfate anions are decreased through dilution in the resulting mixed produced water, as exemplified by the following illustrative volume:volume ratios of the treated produced water to the at least one second produced water: (1:9 ratio gives 0.0009 M [$SO_4^{2-}$] and 0.025 M [$Ca^{2+}$]; 1:1 ratio gives 0.0005 M [$SO_4^{2-}$] and 0.125 M [$Ca^{2+}$]; and 9:1 ratio gives 0.0001 M [$SO_4^{2-}$] and 0.225 M [$Ca^{2+}$]). In the foregoing, the mixed produced water generated from 1:9 and 9:1 volume:volume ratios of the treated produced water to the at least one second produced water have concentrations of dissolved calcium ions and dissolved sulfate anions that, when multiplied together, are less than the solubility product constant for calcium sulfate, thus indicating that calcium sulfate precipitation does not occur. In contrast, the mixed produced waste generated from a 1:1 volume:volume ratio of the treated produced water to the at least one second produced water has concentrations of dissolved calcium ions and dissolved sulfate anions that, when multiplied together, are greater than the solubility product constant for calcium sulfate, thus indicating that calcium sulfate precipitation does occur in the absence of supersaturation. It is to be appreciated that similar considerations apply when utilizing the saturation ratio to determine whether precipitation or scaling may occur. In the case that the product of the dissolved calcium ion concentration and the dissolved sulfate anion concentration exceeds $K_{sp}$, thus indicating that precipitation or scaling of calcium sulfate may occur, one may either mix the treated produced water and the at least one second produced water at a different ratio leading to the solubility product constant not being exceeded (or the saturation ratio not exceeding one), or the concentration of dissolved sulfate anions in the treated produced water may be further lowered by using a greater amount of metal salt for forming a metal sulfate precipitate or by using a different metal salt that affords a lower equilibrium concentration of dissolved sulfate anions following metal sulfate precipitation.

The first produced water and the at least one second produced water may be obtained from separate subterranean reservoirs. Optionally, the separate subterranean reservoirs may reside in the same field but are isolated from one another (e.g., two or more subterranean reservoirs located at different depths, two or more subterranean reservoirs having a different lithology, or two or more subterranean reservoirs that have been exposed to treatment fluids resulting in produced waters having different concentrations of precipitable ions), such that produced waters having different compositions are produced from each subterranean reservoir.

The separate subterranean reservoirs producing the first produced water and the at least one second produced water may be in fluid communication with a common pipeline conveying each of the produced waters (and produced hydrocarbon resources) away from the wells penetrating each subterranean reservoir. That is, a single (common) pipeline may convey each of the produced waters and form a mixed produced water therein. By discharging a treated produced water into the common pipeline instead of an untreated first produced water itself (containing a high concentration of dissolved sulfate anions), formation of calcium sulfate precipitates and calcium sulfate scale within the common pipeline or at a processing location downstream therefrom may be averted. In addition to the first produced water and the at least one second produced water, the common pipeline may carry hydrocarbon resource(s) produced from the various subterranean reservoirs, in which case the common pipeline may lead to a gas-oil processing plant or similar facility, in which the hydrocarbon resource(s) may be further processed and the produced waters separated therefrom.

Optionally, scale inhibitors may be added to the mixed produced water, the treated produced water, the first produced water, the at least one second produced water, or any combination thereof to provide additional protection against calcium sulfate precipitation or scaling. Examples of suitable scale inhibitors include, but are not limited to, organophosphates, (meth)acrylate polymers and copolymer, the like, and any combination thereof. More specific examples of suitable scale inhibitors will be familiar to one having ordinary skill in the art. When used, the scale inhibitors may be added at any time before or after the various produced waters are mixed together, such as in a common pipeline.

Accordingly, in some or other more specific examples, methods of the present disclosure may comprise: providing a first produced water comprising dissolved sulfate anions; treating the first produced water with a metal salt dissolved in an aqueous solution, thereby forming a metal sulfate precipitate and a treated produced water; separating the metal sulfate precipitate from the treated produced water; and after separating the metal sulfate precipitate, mixing the treated produced water with at least one second produced water in a common pipeline to obtain a mixed produced water, the at least one second produced water containing dissolved calcium ions, and the mixed produced water having a saturation ratio for calcium sulfate of less than one in the pipeline.

FIG. 1 is a diagram of a well system containing multiple subterranean reservoirs in fluid communication with a pipeline, in which the methods of the present disclosure may be practiced. As shown, well system 100 includes subterranean reservoirs 102, 104, and 106 in fluid communication via flow paths (e.g., a wellbore and piping extending therefrom) 103, 105, and 107, respectively, with pipeline 110. Pipeline 110 is in fluid communication with processing facility 120, which may be a gas-oil processing facility, for instance.

In non-limiting examples, subterranean reservoirs 102 and 106 may generate produced water having a high concentration of dissolved calcium ions, and subterranean reservoir 104 may generate produced water having a high concentration of dissolved sulfate anions. If the various produced water sources are allowed to co-mingle in pipeline 110, precipitation or scaling of gypsum may occur in pipeline 110 or processing facility 120.

To mitigate the risk of precipitation or scaling according to the present disclosure, the water produced from subterranean reservoir 104 may be diverted from flow path 105 into treatment facility 140 via line 142. Treatment facility 140 may form and remove metal sulfate precipitates according to the disclosure herein. Once metal sulfate precipitates have been formed and separated in treatment facility 140, the treated produced water may be returned to flow path 105 via line 144 and subsequently conveyed to pipeline 110, wherein the risk of precipitation or scaling upon mixing has now been significantly decreased.

Embodiments disclosed herein include:

A. Methods for limiting gypsum precipitation or scaling. The methods comprise: providing a first produced water comprising dissolved sulfate anions; treating the first produced water with a metal salt capable of forming an insoluble metal sulfate, thereby forming a metal sulfate precipitate and a treated produced water; separating the metal sulfate precipitate from the treated produced water; and after separating the metal sulfate precipitate, mixing the treated produced water with at least one second produced water to obtain a mixed produced water, the at least one second produced water containing dissolved calcium ions, and the mixed produced water having a saturation ratio for calcium sulfate of less than 1.

B. Methods for limiting gypsum precipitation or scaling in a pipeline. The methods comprise: providing a first produced water comprising dissolved sulfate anions; treating the first produced water with a metal salt dissolved in an aqueous solution, thereby forming a metal sulfate precipitate and a treated produced water; separating the metal sulfate precipitate from the treated produced water; and after separating the metal sulfate precipitate, mixing the treated produced water with at least one second produced water in a common pipeline to obtain a mixed produced water, the at least one second produced water containing dissolved calcium ions, and the mixed produced water having a saturation ratio for calcium sulfate of less than 1 in the pipeline.

Each of embodiments A and B may have one or more of the following additional elements in any combination:

Element 1: wherein the first produced water is treated with a solid metal salt.

Element 2: wherein the metal salt is dissolved in an aqueous solution.

Element 3: wherein the metal salt is an alkaline earth metal salt.

Element 4: wherein the alkaline earth metal salt comprises at least one of barium chloride, calcium chloride, strontium chloride, or any combination thereof.

Element 5: wherein the metal sulfate precipitate comprises barium sulfate, calcium sulfate, strontium sulfate, or any combination thereof.

Element 6: wherein the treated produced water has a sulfate concentration of about 200 ppm or less.

Element 7: wherein the metal sulfate precipitate is separated using a centrifugal separator, a cyclone separator, a gravitational sedimentation unit, a settling pond, a bag filter, a medium filter, or any combination thereof.

Element 8: wherein the method further comprises using the metal sulfate precipitate as a weighting agent for a subterranean operation.

Element 9: wherein the first produced water and the at least one second produced water are obtained from separate subterranean reservoirs.

Element 10: wherein the separate subterranean reservoirs are in fluid communication with a common pipeline.

Element 11: wherein the first produced water is treated with the metal salt before the treated produced water is mixed with the at least one second produced water in the common pipeline.

By way of non-limiting example, exemplary combinations applicable to embodiments A and B include, but are not limited to: 1 or 2, and 3; 1 or 2, and 3 and 4; 1 or 2, and 5; 1 or 2, and 6; 1 or 2, and 7; 1 or 2, and 8; 1 or 2, and 9; 1 or 2, and 9 and 10; 1 or 2, and 9-11; 3, 4, and/or 5, and 6; 3, 4, and/or 5, and 7; 3, 4, and/or 5, and 8; 3, 4, and/or 5, and 9; 3, 4, and/or 5, and 9 and 10; 3, 4, and/or 5, and 9-11; 6 and 7; 6 and 8; 6 and 9; 6, 9, and 10; 6 and 9-11; 7 and 8; 7 and 9; 7, 9 and 10; 7 and 9-11; 8 and 9; 8-10; 8-11; 9 and 10; and 9-11.

The present disclosure is further directed to the following non-limiting clauses.

Clause 1. A method comprising:

providing a first produced water comprising dissolved sulfate anions;

treating the first produced water with a metal salt capable of forming an insoluble metal sulfate, thereby forming a metal sulfate precipitate and a treated produced water;

separating the metal sulfate precipitate from the treated produced water; and after separating the metal sulfate precipitate, mixing the treated produced water with at least one second produced water to obtain a mixed produced water, the at least one second produced water containing dissolved calcium ions, and the mixed produced water having a saturation ratio for calcium sulfate of less than 1.

Clause 2. The method of clause 1, wherein the first produced water is treated with a solid metal salt.

Clause 3. The method of clause 1, wherein the metal salt is dissolved in an aqueous solution.

Clause 4. The method of any one of clauses 1-3, wherein the metal salt is an alkaline earth metal salt.

Clause 5. The method of clause 4, wherein the alkaline earth metal salt comprises at least one of barium chloride, calcium chloride, strontium chloride, or any combination thereof.

Clause 6. The method of clause 4 or clause 5, wherein the metal sulfate precipitate comprises barium sulfate, calcium sulfate, strontium sulfate, or any combination thereof.

Clause 7. The method of any one of clauses 1-6, wherein the treated produced water has a sulfate concentration of about 200 ppm or less.

Clause 8. The method of any one of clauses 1-7, wherein the metal sulfate precipitate is separated using a centrifugal separator, a cyclone separator, a gravitational sedimentation unit, a settling pond, a bag filter, a medium filter, or any combination thereof.

Clause 9. The method of any one of clauses 1-8, further comprising:

using the metal sulfate precipitate as a weighting agent for a subterranean operation.

Clause 10. The method of any one of clauses 1-9, wherein the first produced water and the at least one second produced water are obtained from separate subterranean reservoirs.

Clause 11. The method of clause 10, wherein the separate subterranean reservoirs are in fluid communication with a common pipeline.

Clause 12. The method of clause 11, wherein the first produced water is treated with the metal salt before the treated produced water is mixed with the at least one second produced water in the common pipeline.

Clause 13. A method comprising:

providing a first produced water comprising dissolved sulfate anions;

treating the first produced water with a metal salt dissolved in an aqueous solution, thereby forming a metal sulfate precipitate and a treated produced water;

separating the metal sulfate precipitate from the treated produced water; and after separating the metal sulfate precipitate, mixing the treated produced water with at least one second produced water in a common pipeline to obtain a mixed produced water, the at least one second produced water containing dissolved calcium ions, and the mixed produced water having a saturation ratio for calcium sulfate of less than 1 in the pipeline.

Clause 14. The method of clause 13, wherein the metal salt is an alkaline earth metal salt.

Clause 15. The method of clause 14, wherein the alkaline earth metal salt comprises at least one of barium chloride, calcium chloride, strontium chloride, or any combination thereof.

Clause 16. The method of clause 14 or clause 15, wherein the metal sulfate precipitate comprises barium sulfate, calcium sulfate, strontium sulfate, or any combination thereof.

Clause 17. The method of any one of clauses 13-16, wherein the treated produced water has a sulfate concentration of about 200 ppm or less.

Clause 18. The method of any one of clauses 13-17, wherein the metal sulfate precipitate is separated using a centrifugal separator, a cyclone separator, a gravitational sedimentation unit, a settling pond, a bag filter, a medium filter, or any combination thereof.

Clause 19. The method of any one of clauses 13-18, further comprising:

using the metal sulfate precipitate as a weighting agent for a subterranean operation.

Clause 20. The method of any one of clauses 13-19, wherein the first produced water and the at least one second produced water are obtained from separate subterranean reservoirs.

Clause 21. The method of clause 20, wherein the separate subterranean reservoirs are each in fluid communication with the common pipeline.

Clause 22. The method of clause 21, wherein the first produced water is treated with the metal salt before the treated produced water is mixed with the at least one second produced water in the common pipeline.

To facilitate a better understanding of the embodiments described herein, the following examples of various representative embodiments are given. In no way should the following examples be read to limit, or to define, the scope of the present disclosure.

EXAMPLES

This example shows the simulated mixing of two illustrative produced waters, the first produced water (Produced Water A) containing a high concentration of calcium ions and the second produced water (Produced Water B) containing a relatively high sulfate ion concentration. Table 1 shows the concentrations of various ions and the pH values of Produced Water A and Produced Water B. The composition of seawater is provided for comparison. If one of the produced waters (e.g., Produced Water B) is obtained from a seawater injection well, the composition of the produced water may be similar to that of seawater.

TABLE 1

| | Concentration (ppm) | | |
| --- | --- | --- | --- |
| | Produced Water A (pH = 5.2) | Produced Water B (pH = 6.9) | Seawater (pH = 7.9) |
| Sodium | 31,915 | 15,709 | 21,800 |
| Potassium | 1,919 | 1,223 | 600 |
| Magnesium | 5,719 | 1,325 | 2,000 |
| Calcium | 32,666 | 1,770 | 600 |
| Strontium | 1,181 | 41 | 10 |
| Bicarbonate | 317 | 1,563 | 150 |
| Chloride | 126,000 | 29,466 | 37,000 |
| Sulfate | 540 | 5,072 | 5,300 |

Figure 2:
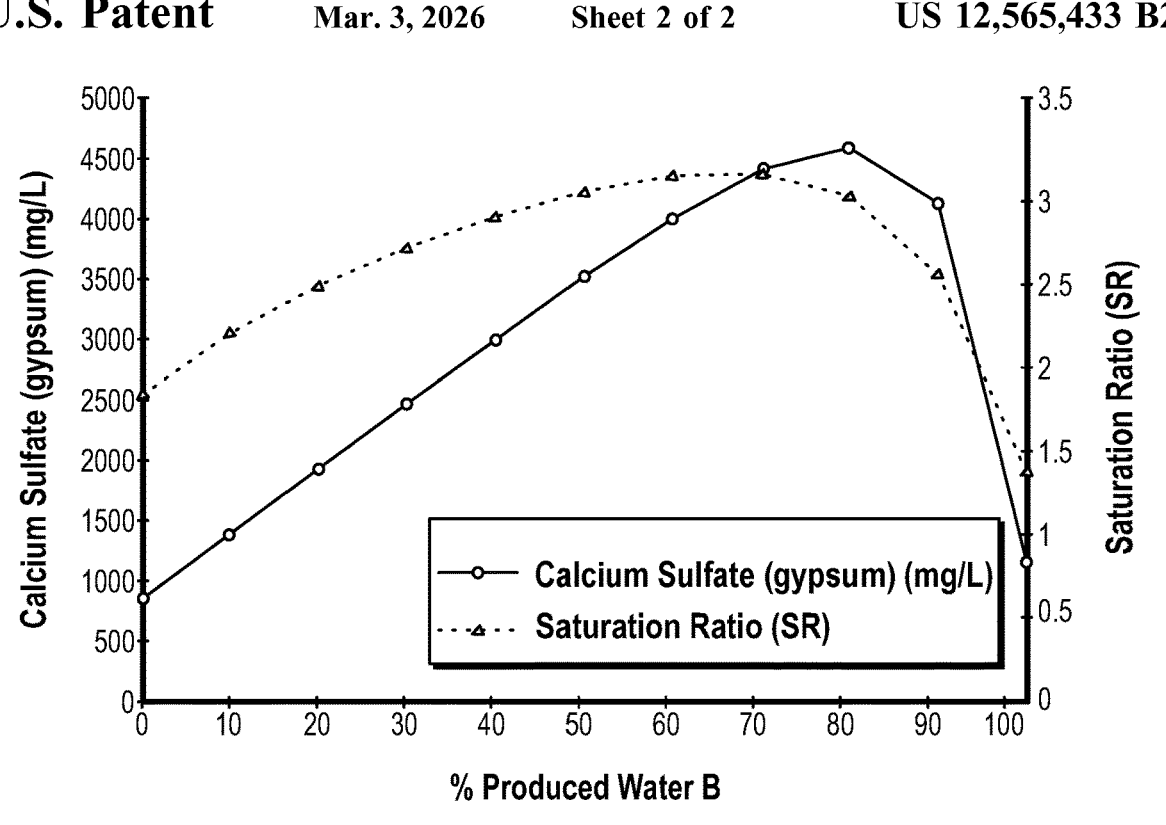
FIG. 2 is a graph showing scale mass and saturation ratio for calcium sulfate dihydrate at various mixing ratios of untreated Produced Water B with Produced Water A.

A thermodynamic model (SCALESOFT-PITZER™) was used to predict the likelihood of calcium sulfate dihydrate precipitation or scaling when mixing Produced Water A and untreated Produced Water B at 160° F. and 400 psi and at various mixing ratios. The SCALESOFT-PITZER™ is an academic program developed by the Brine Chemistry Consortium at Rice University, which is designed for the prediction, treatment, and control of common scale deposits in oil and gas wells. The modeling may be run with or without accounting for scale inhibitors. FIG. 2 is a graph showing scale mass and saturation ratio for calcium sulfate dihydrate at various mixing ratios of untreated Produced Water B with Produced Water A. Saturation ratios greater than one are indicative of possible calcium sulfate dihydrate precipitation or scaling. As shown, Produced Water A alone (0% added Produced Water B) is already slightly oversaturated with respect to calcium sulfate dihydrate, as evidenced by the saturation ratio at 0% added Produced Water B being greater than one. The slight oversaturation can also be demonstrated by examining the product of $[Ca^{2+}(aq)] \times [SO_4^{2-}(aq)]$ in comparison to $K_{sp}$ at 25° C. $([Ca^{2+}(aq)] \times [SO_4^{2-}(aq)] = 4.59 \times 10^{-3} > 3.1 \times 10^{-5})$, which likewise demonstrates an oversaturation condition at 25° C.

At increasing amounts of added Produced Water B, the saturation ratio continues to increase up to about 70% added Produced Water B by volume before decreasing at higher amounts of added Produced Water B. The decrease in saturation ratio above 70% added Produced Water B results from dilution. Even at 100% Produced Water B, the saturation ratio is still greater than one, again reflecting a potential for scaling or precipitation to occur.

Figure 3:
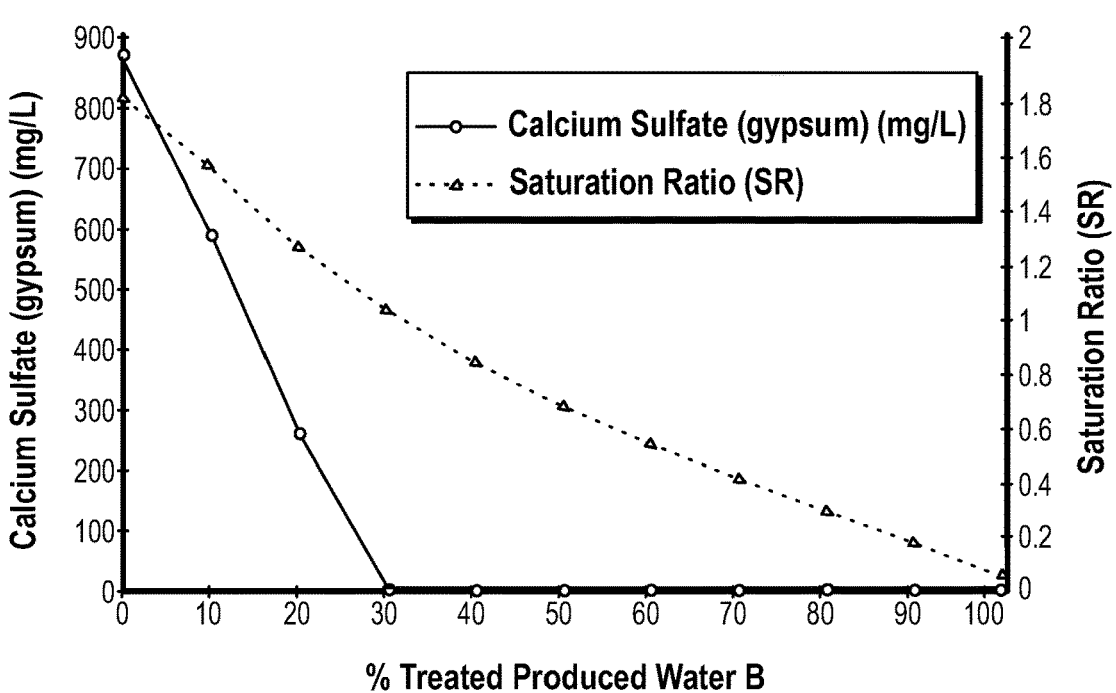
FIG. 3 is a graph showing scale mass and saturation ratio for calcium sulfate dihydrate at various mixing ratios of treated Produced Water B with Produced Water A.

The modeling studies were repeated as above, but with treated Produced Water B being used instead. Specifically, a dissolved sulfate anion concentration of 200 mg/L in treated Produced Water B was modeled, a concentration that may be easily reached through precipitation with a metal salt capable of forming a metal sulfate precipitate. All other concentrations were held at the same values as in untreated Produced Water B. FIG. 3 is a graph showing scale mass and saturation ratio for calcium sulfate dihydrate at various mixing ratios of treated Produced Water B with Produced Water A. Unlike the prior simulation, both the scale mass and saturation ratio decreased with increasing amounts of treated Produced Water B. The decrease in saturation ratio is believed to result from the low sulfate concentration in treated Produced Water B and the dissolved calcium ions in Produced Water A becoming increasingly diluted with addition of more treated Produced Water B. At about 30% added treated Produced Water B by volume, the saturation ratio became less than one, indicating limited potential for precipitation or scaling. In this case, dilution overpowers the already-low sulfate concentration in Produced Water B with respect to scaling. Hence, the saturation ratio curve continually decreased rather than reaching a maximum and then decreasing as in FIG. 2.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art and having benefit of this disclosure will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A method comprising:

providing a first produced water comprising dissolved sulfate anions and having a pH of about 5 to about 8;

treating the first produced water with a metal salt capable of forming an insoluble metal sulfate, thereby forming a metal sulfate precipitate and a treated produced water;

separating the metal sulfate precipitate from the treated produced water; and after separating the metal sulfate precipitate, mixing the treated produced water with at least one second produced water to obtain a mixed produced water, the at least one second produced water containing dissolved calcium ions, and the mixed produced water having a saturation ratio for calcium sulfate of less than 1.

2. The method of claim 1, wherein the first produced water is treated with a solid metal salt.

3. The method of claim 1, wherein the metal salt is dissolved in an aqueous solution.

4. The method of claim 1, wherein the metal salt is an alkaline earth metal salt.

5. The method of claim 4, wherein the alkaline earth metal salt comprises at least one of barium chloride, calcium chloride, strontium chloride, or any combination thereof.

6. The method of claim 4, wherein the metal sulfate precipitate comprises barium sulfate, calcium sulfate, strontium sulfate, or any combination thereof.

7. The method of claim 1, wherein the treated produced water has a sulfate concentration of about 200 ppm or less.

8. The method of claim 1, wherein the metal sulfate precipitate is separated using a centrifugal separator, a cyclone separator, a gravitational sedimentation unit, a settling pond, a bag filter, a medium filter, or any combination thereof.

9. The method of claim 1, further comprising:

using the metal sulfate precipitate as a weighting agent for a subterranean operation.

10. A method comprising:

providing a first produced water comprising dissolved sulfate anions;

treating the first produced water with a metal salt capable of forming an insoluble metal sulfate, thereby forming a metal sulfate precipitate and a treated produced water;

separating the metal sulfate precipitate from the treated produced water; and after separating the metal sulfate precipitate, mixing the treated produced water with at least one second produced water to obtain a mixed produced water, the at least one second produced water containing dissolved calcium ions, and the mixed produced water having a saturation ratio for calcium sulfate of less than 1;

wherein the first produced water and the at least one second produced water are obtained from separate subterranean reservoirs.

11. The method of claim 10, wherein the separate subterranean reservoirs are in fluid communication with a common pipeline.

12. The method of claim 11, wherein the first produced water is treated with the metal salt before the treated produced water is mixed with the at least one second produced water in the common pipeline.

13. A method comprising:

providing a first produced water comprising dissolved sulfate anions and having a pH of about 5 to about 8;

treating the first produced water with a metal salt dissolved in an aqueous solution, thereby forming a metal sulfate precipitate and a treated produced water;

separating the metal sulfate precipitate from the treated produced water; and after separating the metal sulfate precipitate, mixing the treated produced water with at least one second produced water in a common pipeline to obtain a mixed produced water, the at least one second produced water containing dissolved calcium ions, and the mixed produced water having a saturation ratio for calcium sulfate of less than 1 in the common pipeline.

14. The method of claim 13, wherein the metal salt is an alkaline earth metal salt.

15. The method of claim 14, wherein the alkaline earth metal salt comprises at least one of barium chloride, calcium chloride, strontium chloride, or any combination thereof.

16. The method of claim 14, wherein the metal sulfate precipitate comprises barium sulfate, calcium sulfate, strontium sulfate, or any combination thereof.

17. The method of claim 13, wherein the treated produced water has a sulfate concentration of about 200 ppm or less.

18. The method of claim 13, wherein the metal sulfate precipitate is separated using a centrifugal separator, a cyclone separator, a gravitational sedimentation unit, a settling pond, a bag filter, a medium filter, or any combination thereof.

19. The method of claim 13, further comprising:

using the metal sulfate precipitate as a weighting agent for a subterranean operation.

20. The method of claim 10, wherein the metal salt is dissolved in an aqueous solution, the treated produced water and the at least one second produced water are mixed in a common pipeline, and the mixed produced water has a saturation ratio for calcium sulfate of less than 1 in the common pipeline.

21. The method of claim 20, wherein the separate subterranean reservoirs are each in fluid communication with the common pipeline.

22. The method of claim 21, wherein the first produced water is treated with the metal salt before the treated produced water is mixed with the at least one second produced water in the common pipeline.

* * * * *